Figure 1:
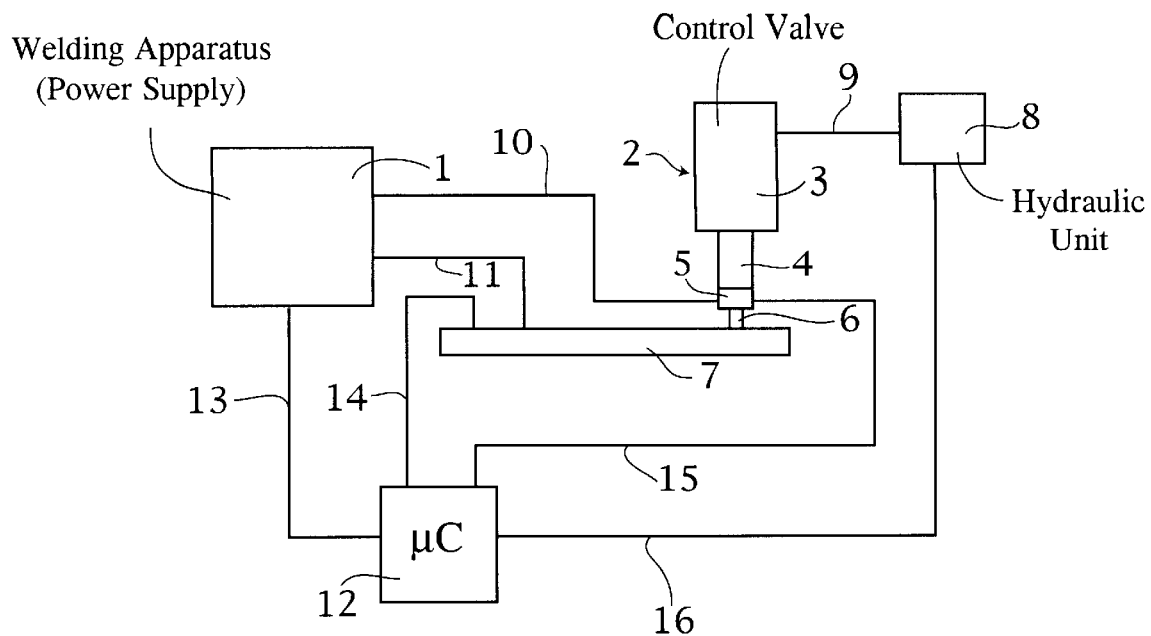

United States Patent
von Däniken

[11] Patent Number: 5,977,506
[45] Date of Patent: *Nov. 2, 1999

[54] WELDING METHOD FOR THE CONNECTION OF A COMPONENT TO A WORKPIECE, AND A DEVICE FOR CARRYING OUT THE METHOD

[75] Inventor: Kurt von Däniken, Mannebach, Switzerland

[73] Assignee: Emhart Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,912

[22] PCT Filed: Sep. 26, 1995

[86] PCT No.: PCT/IB95/00794

§ 371 Date: Apr. 3, 1997

§ 102(e) Date: Apr. 3, 1997

[87] PCT Pub. No.: WO96/10468

PCT Pub. Date: Apr. 11, 1996

[30] Foreign Application Priority Data

Oct. 3, 1994 [CH] Switzerland ............ 02 979/94

[51] Int. Cl.$^6$ ........................ B23K 9/20
[52] U.S. Cl. ........................ 219/99; 219/98
[58] Field of Search ............ 219/98, 99, 124.03

[56] References Cited

U.S. PATENT DOCUMENTS

| | | |
|---|---|---|
| 4,456,808 | 6/1984 | Wilkinson et al. . |
| 4,650,957 | 3/1987 | Cullen et al. . |
| 4,797,529 | 1/1989 | Schmitt et al. ............ 219/98 |
| 5,070,226 | 12/1991 | Raycher et al. ............ 219/98 |
| 5,317,123 | 5/1994 | Ito ............ 219/98 |
| 5,321,226 | 6/1994 | Raycher ............ 219/98 |
| 5,406,044 | 4/1995 | Killian et al. ............ 219/98 |

FOREIGN PATENT DOCUMENTS

| | | |
|---|---|---|
| 0241249 | 10/1987 | European Pat. Off. . |
| 0488518 | 6/1992 | European Pat. Off. . |
| 4236526 | 5/1994 | Germany . |
| 19524490 | 1/1997 | Germany . |
| 92/11970 | 7/1992 | WIPO . |

*Primary Examiner*—Clifford C. Shaw
*Attorney, Agent, or Firm*—Edward D. Murphy

[57] ABSTRACT

In a welding method for the connection of a component (6) to a workpiece (7) by means of an arc between the component end and a welding point on the workpiece (7), the arc voltage is set and is monitored continuously during the welding process. The component lift is in each case automatically adjusted accordingly.

12 Claims, 1 Drawing Sheet

WELDING METHOD FOR THE CONNECTION OF A COMPONENT TO A WORKPIECE, AND A DEVICE FOR CARRYING OUT THE METHOD

The invention relates to an arc welding method for the connection of a component to a workpiece and to an apparatus for carrying out the method.

Such a method is known and is used for achieving a weld by means of an arc quickly and correctly. The components used are, for example, bolts or studs. In known methods, the arc voltage is set mechanically by means of the component lift. Specifically, the component lift is essentially proportional to the arc voltage. In this case, a value based on experience is set permanently. The arc voltage changes continuously during the welding process as a result of the surface characteristics of the parts to be welded and as a result of tolerances in the material production and in the contact pressure of the welding head used, which leads to quality fluctuations in the welds.

Patent Specification EP-B-0 241 249 describes a control circuit arrangement for the arc welding of components, a sequence controller determining the trigger moments of the rearward movement and of the forward movement of the welding arc, and a monitoring voltage being derived from a preweld current arc, which monitoring voltage is converted into a correction voltage and superimposed on a control voltage in order to control a changeover mode power supply unit which, using the control voltage corrected in this manner, adjusts its output current during the welding process to the resistance of the preweld current arc, said resistance being derived from the monitoring voltage. The trigger moments of the rearward movement and of the welding arc can also be corrected in the sequence controller with the aid of the monitoring voltage, which is derived from the preweld current arc. The magnitude of the output current and the welding time are thus adjusted for every welding process on the basis of the preweld current arc voltage. The component lift is adjusted by means of a cylindrical coil and a spring. Here too, the arc voltage can vary continuously during the welding process, as a result of the factors mentioned above, which leads to undesirable reductions in quality.

The known mechanical adjustment of the component lift and the insertion dimension for influencing the arc voltage allows these parameters to be corrected only once per weld. In addition, the mechanical adjustment of the component lift and the insertion dimension results in the risk of producing defective quality results because of incorrect adjustment. In practice, with the time pressure to which the operator is subject in each case, it is not always possible to avoid or to correct inaccuracies and deviations from the optimum settings. This results in corresponding reductions in quality, and scrap. In addition, the operation of the known welding devices is subject to correspondingly stringent requirements. Furthermore, as a result of the increasing quality requirements, it is desirable to ensure and, if necessary, to correct the quality directly in the production process itself.

The invention is based on the object of creating a method of the generic type which avoids the disadvantages indicated above, complies with present-day quality assurance demands, and can be carried out easily.

The stated object is achieved according to the invention in that a reference voltage profile is set for the arc voltage and the arc voltage is measured and compared with the current reference voltage repeatedly during the welding process in a control loop, as a controlled variable, a correction variable in each case being determined from the difference between the measured arc voltage and the current reference voltage, by means of which correction variable the component lift is in each case automatically corrected, as a manipulated variable. In consequence, the desired arc voltage is maintained precisely during the entire welding process, which ensures a significant improvement in the welding quality for different workpiece surface characteristics. In addition, time-consuming adjustments and corrections of the distance between the workpiece and the stud are no longer necessary.

A device for carrying out the method is characterized in that the device comprises a stud welding apparatus, a welding head control unit having a stud holder, and a microprocessor controller.

Advantageous developments of the invention result from the further subclaims.

Figure 2:
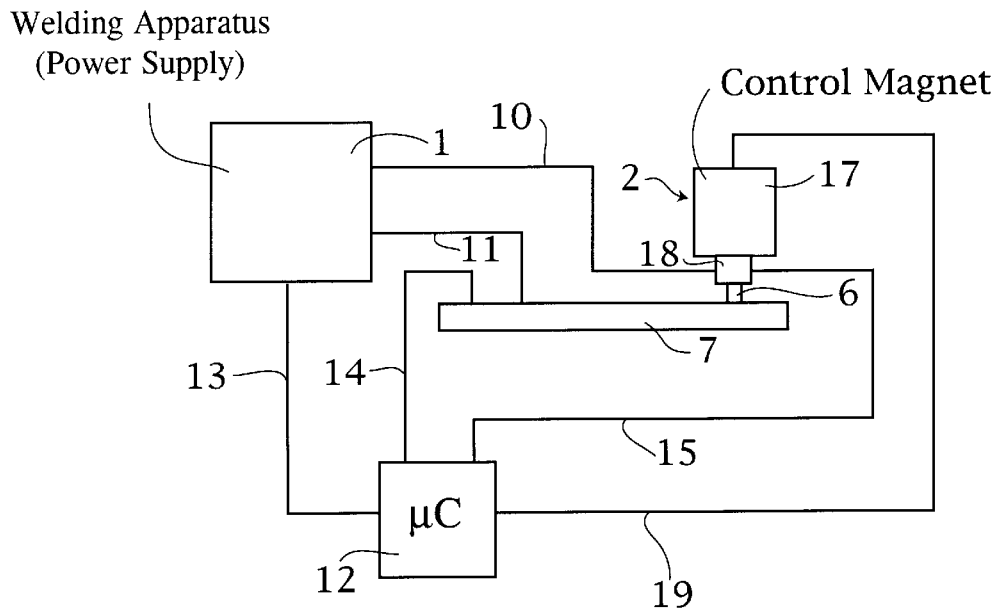

A number of exemplary embodiments of the invention are explained in more detail in the following text, with reference to the drawings, in which:

FIG. 1 shows a sketch of one embodiment of the device according to the invention, and FIG. 2 shows a sketch of a further embodiment.

FIG. 1 shows schematically a first embodiment of the device according to the invention. A component which is to be welded to a workpiece is called a stud in the following text, for the sake of simplicity, although the invention is, of course, not limited to such components. The device comprises a stud welding apparatus 1 which is known per se and is suitable for the generation of an adjustable welding current during a welding time, which is likewise adjustable. The adjustment is carried out as a function of the material used and of the weld diameter. A welding head control unit 2 comprises a hydraulic control valve 3 with built-in electronics, which is known per se and is suitable for carrying out quick and precise position control hydraulically, on the basis of an input signal. The control valve 3 is connected to a hydraulic cylinder 4 on which a stud holder 5 is mounted, which is suitable for holding a stud 6 which is to be welded to a workpiece 7. Furthermore, the control valve 3 is connected via a hydraulics and control line 9 to a hydraulic unit 8, which is known per se. The stud holder 5 is connected via a welding current line 10 to the stud welding apparatus 1. The hydraulic cylinder 4 is thus used, together with the stud holder 5, as a welding head. The stud welding apparatus 1 is connected via an earth line 11 to the workpiece 7. A microprocessor controller 12 is connected via a control line 13 to the stud welding apparatus 1. Furthermore, the microprocessor controller 12 is connected via a measurement line 14 to the workpiece 7, and via a measurement line 15 to the stud holder 5. Finally, the microprocessor controller 12 is connected via a control line 16 to the hydraulic unit 8. The welding head control unit 2 can have a supporting foot for placing the stud 6 precisely onto the workpiece 7. However, the welding head control unit 2 is preferably combined with a position measurement system, which is not shown and is known per se.

In order to weld a stud 6 to a workpiece 7, a reliable electrical contact is initially produced between the stud end and the welding point of the workpiece 7, by placing the stud 6 onto a welding point on the workpiece 7. This null position is measured by means of the position measurement system and is stored in the microprocessor controller 12 as a reference. The welding time and the welding current as well as the desired arc voltage (that is to say the reference voltage profile for the arc voltage control variable during the welding process) and the ratio between the arc voltage and the distance between the stud and the workpiece are set in the microprocessor controller 12 and are passed on via the control line 13 to the stud welding apparatus 1. In addition, further parameters relating to the insertion of the melted stud end into the melted welding point on the workpiece 7 can be adjusted as described in the following text.

The actual welding process is then carried out by lifting the stud 6 off the workpiece 7 and by producing an arc between the stud end and the welding point on the workpiece 7, in order to melt the latter. The current arc voltage is measured by the measurement lines 14 and 15, and is compared with the current reference voltage of the set reference voltage profile repeatedly as a controlled variable in a control loop by means of the microprocessor controller 12 throughout the entire welding process, a correction variable in each case being determined from the difference between the measured arc voltage and the current reference voltage. This correction variable is in each case fed via the control line 16 to the hydraulic unit 8 which in each case produces a corresponding correction to the distance between the stud and the workpiece, by means of the control valve 3, via the hydraulics and control line 9. The distance between the stud and the workpiece is thus in each case automatically corrected as a manipulated variable in the control loop, by converting the determined correction variable by means of the hydraulic unit 8 and the hydraulic control valve 3. The arc voltage is monitored continuously during welding, and the distance between the stud and workpiece is adjusted accordingly several hundred times per second.

The resetting and insertion of the melted stud end into the melted welding point on the workpiece 7 is also detected and controlled via the microprocessor controller 12. On completion of the formation of the arc, the automatic correction of the distance between the stud and the workpiece by means of the control loop is also completed. The last setting of the distance between the stud and the workpiece is measured by means of the position measurement system and stored in the microprocessor controller 12, the stored null position being used as a reference value. The controlled resetting of the distance between the stud and the workpiece and the insertion are now carried out. The insertion depth (also called the insertion dimension) and the rate of insertion can be set in the microprocessor controller 12, the stored null position in each case being used as a reference value. The set values are converted into the insertion dimension and into the rate of insertion by means of the hydraulic control valve 3, which is combined with the position measurement system. This is in turn done by means of a control loop, the insertion dimension in this case being measured and adapted, on the basis of the predetermined setting values, repeatedly as a controlled variable by means of the position measurement system. In this way, high precision is achieved completely automatically even during the resetting and during insertion, which once again leads to an improvement in the weld quality. After achieving the set maximum insertion depth, a movement back to the null position is carried out again after a resetting time, which is likewise adjustable.

The described hydraulic embodiment is primarily suitable for relatively large installations, it being possible to install welding head control unit 2 permanently.

FIG. 2 shows a sketch of a further embodiment. In this case, the welding head control unit 2 comprises a control magnet 17 and a stud holder 18 which is connected thereto, is in turn suitable for holding a stud 6, which is to be welded to a workpiece 7, and is connected via the welding current line 10 to the stud welding apparatus 1, so that the control magnet 17 is used, with the stud holder 18, as a welding head. The control magnet 17 is, for example, a modified hydraulic control valve. On the basis of a control valve with built-in electronics, which is known per se, is used in hydraulics and is suitable for carrying out quick and precise position control hydraulically on the basis of an input signal, this control valve is modified such that the hydraulic valve part was omitted and the magnetically controlled shaft was connected directly to the stud holder 18. A control magnet 17 is thus implemented in a simple manner with high precision, an integrated position measurement system additionally already being present. The control magnet 17 is connected via a control line 19 to the microprocessor controller 12.

The sequence of the welding process is similar to that in the case of the hydraulic variant described above. All the required position measurements can, however, be carried out directly using the position measurement system integrated in the control magnet 17. The correction variable, which is in each case determined by the microprocessor controller 12, for the distance between the stud and workpiece is fed via the control line 19 directly to the electronically controlled control magnet 17, which in each case produces a corresponding correction to the distance between the stud and the workpiece. The distance between the stud and workpiece is thus in each case corrected automatically as a manipulated variable in the control loop, by conversion of the determined correction variable by means of the control magnet 17.

Even a simple analog controller is sufficient, for example, for this purpose, in the case of which the arc voltage is measured and compared in a comparator with the current reference voltage continuously, the difference being processed via a filter and a PD or PID regulator and being fed to the control magnet 17 as a correction signal. In this case, the inertia of the control magnet 17, although it is low, also contributes to the filtering of voltage spikes and thus to the avoidance of resonances.

The resetting and insertion are also carried out in a similar manner to that described above with reference to FIG. 1. In this case, the values which are set in the microprocessor controller 12 for the rate of insertion and the insertion dimension are converted into the desired movement by means of the control magnet 17.

The electromagnetic embodiment described can easily be operated by hand if the control magnet 17 is constructed, with the stud holder 18, as a welding gun.

According to a further embodiment, which is not shown, the automatic correction of the distance between the stud and workpiece and the setting of the insertion dimension are carried out by conversion of the determined correction variables by means of an electric motor and a spindle.

The method according to the invention and the devices according to the invention for the automatic adjustment of the distance between the stud and the workpiece and the insertion dimension can be combined directly with any commercially available stud welding apparatuses using the lift-of ignition or short-cycle methods. In the case of stud welding apparatuses having a microprocessor controller, the microprocessor controller 12 can be integrated.

We claim:

1. A welding method for connecting a component to a workpiece, comprising the steps of:

setting the component onto a welding point on the workpiece;

lifting the component off the workpiece and producing an arc between the component end and the welding point on the workpiece, in order to melt the latter;

resetting and inserting the melted component end into the melted welding point on the workpiece;

characterized in that a reference voltage profile is set for the arc voltage and the arc voltage is measured and compared with the reference voltage profile repeatedly during the welding process in a control loop, as a controlled variable, a correction variable in each case being determined from the difference between the measured arc voltage and the reference voltage profile, and varying the component lift in accordance with said correction variable.

2. Method according to claim 1, characterized in that the resetting and insertion are carried out automatically at an adjustable speed and to an adjustable insertion depth.

3. A welding method for connecting a component having an end to a workpiece, comprising the steps of:

setting the end of the component onto a welding point on the workpiece;

applying a current through a circuit that includes the component end and the welding point on the workpiece;

lifting the component off the workpiece to thereby produce an arc between the component end and the welding point on the workpiece in order to melt the component end and the welding point, the arc produced thereby having associated therewith an arc voltage;

establishing a reference voltage profile representing desired arc voltage values during the welding process;

measuring the arc voltage and comparing the measured arc voltage with said reference voltage profile and determining the difference therebetween;

adjusting the position of the component relative to the workpiece in accordance with said determined difference to thereby vary the arc voltage; and resetting and inserting the melted component end into the melted welding point on the workpiece.

4. The method of claim 3 wherein the position of the component relative to the workpiece is adjusted so as to cause said measured arc voltage to correspond with said reference voltage profile.

5. The method of claim 4 wherein the arc voltage is repeatedly measured and compared to said reference voltage profile and the position of the component relative to the workpiece adjusted accordingly to cause the arc voltage to correspond with said reference voltage profile during the welding process.

6. The method of claim 5 wherein the resetting and inserting step is performed at an adjustable speed and to an adjustable insertion depth.

7. A stud welding apparatus for connecting a stud having an end to a workpiece, comprising:

a welding head control unit having a stud holder and positioning means connected to said stud holder for positioning the stud relative to a welding point on the workpiece;

a power supply circuit for applying a welding current through a circuit that includes the stud end and the welding point on the workpiece;

a controller connected to said welding head control unit, the controller producing a control signal that is supplied to said welding head control unit to cause said positioning means to lift the stud off the workpiece and thereby produce an arc between the stud end and the welding point on the workpiece in order to melt the stud end and the welding point, said arc having associated therewith an arc voltage;

circuit means connected to said controller for sensing said arc voltage;

said controller further including a memory for storing a reference voltage profile representing desired arc voltage values during the welding process and means for comparing the sensed arc voltage to said reference voltage profile and producing a further control signal that is supplied to said welding head control unit to cause said positioning means to adjust the position of the stud relative to the workpiece in accordance with the difference between the sensed arc voltage and said reference voltage profile.

8. The stud welding apparatus of claim 7 wherein the position of the stud is adjusted so as to cause the arc voltage to correspond to said reference voltage profile.

9. The stud welding apparatus of claim 8 wherein the controller is adapted to repeatedly compare the sensed arc voltage to said reference voltage profile and produce a control signal that is provided to said welding head control unit to adaptively adjust the position of the stud during the welding process.

10. The stud welding apparatus of claim 9 wherein the positioning means of said welding head control unit comprises a hydraulic control valve, a hydraulic cylinder, and a hydraulic unit.

11. The stud welding apparatus of claim 9 wherein the positioning means of said welding head control unit comprises a control magnet.

12. The stud welding apparatus of claim 9 wherein the positioning means of said welding head control unit comprises an electric motor and a spindle.

* * * * *